US012452693B2

(12) United States Patent
Shimizu et al.

(10) Patent No.: US 12,452,693 B2
(45) Date of Patent: Oct. 21, 2025

(54) POSITION-BASED BEAM SWEEPING FOR DIRECTIONAL VEHICLE-TO-EVERYTHING (V2X) NETWORKS

(71) Applicant: TOYOTA JIDOSHA KABUSHIKI KAISHA, Toyota (JP)

(72) Inventors: Takayuki Shimizu, Mountain View, CA (US); Hongsheng Lu, Mountain View, CA (US); John Kenney, Mountain View, CA (US)

( * ) Notice: Subject to any disclaimer, the term of this patent is extended or adjusted under 35 U.S.C. 154(b) by 42 days.

(21) Appl. No.: 16/370,437

(22) Filed: Mar. 29, 2019

(65) Prior Publication Data

US 2020/0314662 A1    Oct. 1, 2020

(51) Int. Cl.
*H04W 16/28* (2009.01)
*H04W 4/40* (2018.01)
*H04W 64/00* (2009.01)
*H04W 72/044* (2023.01)

(52) U.S. Cl.
CPC ............ *H04W 16/28* (2013.01); *H04W 4/40* (2018.02); *H04W 64/00* (2013.01); *H04W 72/046* (2013.01)

(58) Field of Classification Search
CPC ....... H04W 16/28; H04W 4/40; H04W 64/00; H04W 72/046
USPC ......................................................... 455/450
See application file for complete search history.

(56) References Cited

U.S. PATENT DOCUMENTS

| 9,731,645 | B1 * | 8/2017 | Taleb-Bendiab ............................. G08G 1/096716 |
| 10,098,014 | B1 | 10/2018 | Shimizu et al. |
| 10,211,906 | B1 * | 2/2019 | Nam ...................... H04B 7/0478 |
| 2014/0044042 | A1 * | 2/2014 | Moshfeghi ............... H04B 7/12 370/328 |
| 2015/0230263 | A1 * | 8/2015 | Roy ....................... H04W 64/00 455/452.2 |
| 2017/0111122 | A1 * | 4/2017 | Shimizu .................. H04L 67/16 |

(Continued)

FOREIGN PATENT DOCUMENTS

| WO | WO-2018026188 A1 * | 2/2018 | ........... H04L 5/0053 |
| WO | 2018131934 | 7/2018 | |
| WO | WO-2019160973 A1 * | 8/2019 | |

OTHER PUBLICATIONS

EPO, International Search Report and Written Opinion for International Patent Application No. PCT/US2020/025117, Jun. 17, 2020, 19 pages.

(Continued)

*Primary Examiner* — Charles N Appiah
*Assistant Examiner* — Nicole M Louis-Fils
(74) *Attorney, Agent, or Firm* — Burbage Law, P.C.; Jon-Michael Burbage

(57) ABSTRACT

The disclosure includes embodiments for executing a beam alignment for a millimeter wave (mmWave) communication based on position data. In some embodiments, a method for an ego vehicle includes determining a beam sweeping direction setting for a mmWave beam alignment with an endpoint based on position data that describes a geographic location of the endpoint. The method includes modifying an operation of a Vehicle-to-Everything (V2X) radio of the ego vehicle to perform the mmWave beam alignment with the endpoint based on the beam sweeping direction setting so that an efficiency of the mmWave beam alignment is improved.

20 Claims, 8 Drawing Sheets

(56) References Cited

U.S. PATENT DOCUMENTS

| | | | |
|---|---|---|---|
| 2017/0248430 A1* | 8/2017 | Holden | G06F 21/552 |
| 2017/0290034 A1* | 10/2017 | Desai | H04W 4/027 |
| 2017/0365166 A1* | 12/2017 | Lu | G08G 1/0133 |
| 2018/0206063 A1* | 7/2018 | Frenger | G01S 5/0045 |
| 2018/0206170 A1* | 7/2018 | Nagaraja | H04B 7/0695 |
| 2018/0331740 A1* | 11/2018 | Orhan | H04B 7/0695 |
| 2018/0365909 A1* | 12/2018 | Cheng | H04Q 9/00 |
| 2019/0132709 A1* | 5/2019 | Graefe | H04W 4/38 |
| 2019/0289426 A1* | 9/2019 | Persson | G01S 3/46 |
| 2019/0306726 A1* | 10/2019 | Mo | H04W 24/10 |
| 2019/0373502 A1* | 12/2019 | Chae | H04W 72/12 |
| 2020/0008110 A1* | 1/2020 | Yousif | H04W 48/04 |
| 2020/0088528 A1* | 3/2020 | Mishra | G06F 16/29 |
| 2020/0128436 A1 | 4/2020 | Chae et al. | |
| 2020/0234574 A1* | 7/2020 | Park | G05D 1/02 |
| 2020/0288374 A1* | 9/2020 | Henry | H04W 40/22 |
| 2021/0007073 A1* | 1/2021 | Lee | H04W 76/14 |
| 2022/0039080 A1* | 2/2022 | Khoryaev | H04W 4/40 |

OTHER PUBLICATIONS

Lien, et al., "Latency-Optimal mmWave Radio Access for V2X Supporting Next Generation Driving Use Cases," IEEE Access, vol. 7, Dec. 20, 2018, pp. 6782-6795.

\* cited by examiner

POSITION-BASED BEAM SWEEPING FOR DIRECTIONAL VEHICLE-TO-EVERYTHING (V2X) NETWORKS

BACKGROUND

The specification relates to position-based beam sweeping for directional Vehicle-to-Everything (V2X) networks.

A mobile operating environment is one which includes connected vehicles traveling at roadway speeds. One challenge to deploying millimeter wave (mmWave) communication technologies communication technology in mobile environments is that mmWave communication typically includes an execution of a beam alignment process. The mmWave communication between two endpoints is generally not possible without first completing the beam alignment process between these two endpoints. For example, appropriate beam pointing between a transmitter (e.g., a first endpoint) and a receiver (e.g., a second endpoint) is needed before exchanging data between the transmitter and the receiver. It is currently difficult or impossible to implement mmWave communications between vehicles because existing mmWave technologies are designed for low mobility environments and, as such, cannot complete the beam alignment process in a timely fashion that is sufficiently quick for mobile operating environments.

SUMMARY

One general aspect in embodiments described herein includes a computer program product including a non-transitory memory of an onboard vehicle computer system of an ego vehicle storing computer-executable code that, when executed by a processor, causes the processor to: receive a V2X message that includes position data describing a geographic location of an endpoint; determine, based on the position data of the endpoint, a beam sweeping direction setting that includes a directional sweeping range for a mmWave beam alignment with the endpoint; and modify an operation of a V2X radio of the ego vehicle to perform the mmWave beam alignment with the endpoint based on the beam sweeping direction setting so that a mmWave radio beam of the V2X radio is configured to sweep within the directional sweeping range to improve an efficiency of the mmWave beam alignment. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor further to: modify the operation of the V2X radio of the ego vehicle to execute a mmWave communication with the endpoint using the mmWave beam alignment. The computer program product where the directional sweeping range includes the geographic location of the endpoint. Implementations of the described techniques may include hardware, a method or process, or computer software on a computer-accessible medium.

One general aspect includes a method for an ego vehicle, including: determining a beam sweeping direction setting for a mmWave beam alignment with an endpoint based on position data that describes a geographic location of the endpoint; and modifying an operation of a V2X radio of the ego vehicle to perform the mmWave beam alignment with the endpoint based on the beam sweeping direction setting so that an efficiency of the mmWave beam alignment is improved. Other embodiments of this aspect include corresponding computer systems, apparatus, and computer programs recorded on one or more computer storage devices, each configured to perform the actions of the methods.

Implementations may include one or more of the following features. The method further including modifying the operation of the V2X radio of the ego vehicle to execute a mmWave communication with the endpoint using the mmWave beam alignment. The method where the beam sweeping direction setting includes a directional sweeping range within which a mmWave radio beam of the V2X radio is configured to sweep during the mmWave beam alignment. The method where the directional sweeping range includes the geographic location of the endpoint. The method further including receiving a V2X message that includes the position data from the endpoint. The method where the V2X message further includes position accuracy data describing an accuracy of the position data, and the beam sweeping direction setting is determined further based on the position accuracy data. The method where the V2X message further includes a data sharing request from the endpoint. The method further including transmitting a reply V2X message that includes an acknowledgement to the data sharing request, where the acknowledgement includes schedule information for a mmWave communication between the ego vehicle and the endpoint so that directional transmission and reception of the mmWave communication are enabled according to the schedule information. The method where the endpoint includes a remote vehicle, a roadside unit or a base station. Implementations of the described techniques may include hardware, a method or process, or computer software on a computer-accessible medium.

One general aspect includes a system including an onboard vehicle computer system of an ego vehicle including a non-transitory memory storing computer code which, when executed by the onboard vehicle computer system, causes the onboard vehicle computer system to: determine a beam sweeping direction setting for a mmWave beam alignment with an endpoint based on position data that describes a geographic location of the endpoint; and modify an operation of a V2X radio of the ego vehicle to perform the mmWave beam alignment with the endpoint based on the beam sweeping direction setting so that an efficiency of the mmWave beam alignment is improved. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system further to modify the operation of the V2X radio of the ego vehicle to execute a mmWave communication with the endpoint using the mmWave beam alignment. The system where the beam sweeping direction setting includes a directional sweeping range within which a mmWave radio beam of the V2X radio is configured to sweep during the mmWave beam alignment. The system where the directional sweeping range includes the geographic location of the endpoint. The system where the computer code, when executed by the onboard vehicle computer system, causes the onboard vehicle computer system further to receive a V2X message that includes the position data from the endpoint. The system where the V2X message further includes position accuracy data describing an accuracy of the position data, and the beam sweeping direction setting is determined further based on the position accuracy data. The system where the V2X message further includes a data sharing request from the endpoint. The system where the computer code, when executed by the onboard vehicle computer system, causes the onboard vehicle computer system further to transmit a reply V2X message that includes an acknowledgement to the data sharing request, where the acknowledgement includes schedule information for a mmWave communication between the ego vehicle and the endpoint so that directional transmission and reception of the mmWave communication are enabled according to the schedule information. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

As used herein, the term "vehicle" may refer to a connected vehicle that includes any hardware or software that is necessary to send and receive wireless communications.

Application of mmWave communications is beneficial in mobile operating environments because mmWave communications enable communication devices, such as connected vehicles, to send and receive large amounts of digital data (e.g., 0 to 1000 gigabytes of digital data) in an amount of time that is acceptable to users (e.g., drivers) or within me predetermined safety standard. Such mmWave communications have a great potential for massive consumer applications (e.g.: IEEE802.11ad/WiGig for high-speed and short-range communication; 5G cellular communications; and automated driving applications such as sensor data sharing, 3D high-definition (HD) map generation and distribution, etc.). For example, a vehicle may use mmWave communications to exchange large data sets with one or more of the following: (1) roadside equipment; (2) edge servers; (3) cloud servers; and (4) other vehicles.

Figure 1A:
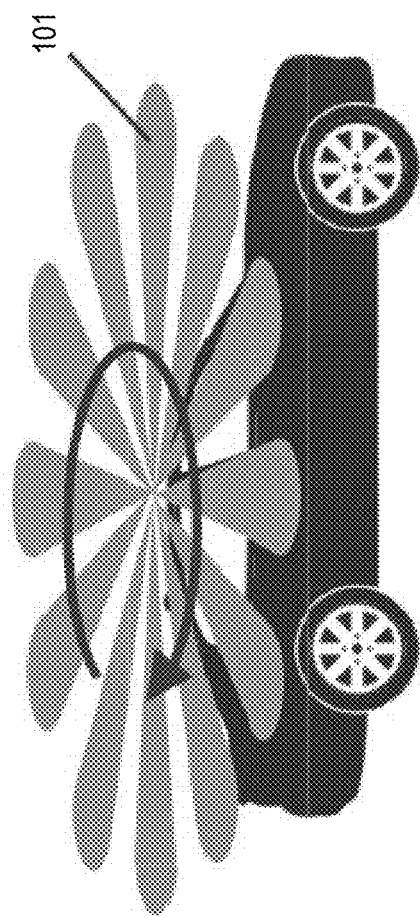
FIG. 1A is a graphical representation illustrating an example directional beam sweeping that mimics an omni-directional broadcast transmission.

Directional V2X communications may be applied in the mmWave communications for compensating a high path loss and achieving a high data rate in the mmWave communications. For example, with reference to FIG. 1A, the use of a directional V2X communication may include executing multiple transmissions of a same message in different directions to mimic an omni-directional broadcast transmission during a beam alignment process. For example, each directional beam lobe 101 in the directional V2X communication carries the same message and forms a 360-degree beam sweeping as a whole, which is similar to a virtual broadcast using the directional beam sweeping. However, this omni-directional beam sweeping results in wasted communications such as inefficient utilization of the wireless communication spectrum, particularly in sparsely populated environments where not many candidate receivers are present. For example, when a narrow beam is used for each directional beam lobe 101 at a transmitter and there are few receivers in the vicinity of the transmitter, most of the directional transmissions by the transmitter during the beam alignment process are useless and therefore wasted.

Described herein are embodiments of a modification system that is capable of improving an efficiency of a beam alignment process for a mmWave communication. The modification system is operable to adaptively determining a beam sweeping direction setting for a mmWave communication between an ego vehicle and an endpoint based on a geographical location of the endpoint. For example, during the beam alignment process, the modification system described herein does not attempt to mimic omni-directional communications because the modification system has knowledge about where the endpoint is located. The modification system beneficially sends unidirectional communications in a direction where the endpoint is located and not in a direction where the endpoint is not located. As a result, time, processing power and energy consumed by the beam alignment process can be reduced because fewer transmissions need to occur when compared with the omni-directional beam sweeping. As a result, vehicles which include the embodiments of the modification system described herein are able to successfully deploy mmWave communication technology because they are able to complete the beam alignment process in a timely fashion that is sufficiently quick for mobile operating environments as measured against user expectations and existing safety standards.

In some embodiments, the modification system includes software installed in an electronic control unit (ECU) of the ego vehicle. The modification system adaptively determines a beam sweeping direction setting for mmWave communications with an endpoint based on position data that describes a geographic location of the endpoint. The endpoint can be a remote vehicle, a base station, a roadside unit, etc. The modification system modifies an operation of a V2X radio of the ego vehicle by performing a mmWave beam alignment for the V2X radio of the ego vehicle based on the beam sweeping direction setting. The modification system causes the V2X radio of the ego vehicle to execute a mmWave communication with the endpoint using the mmWave beam alignment.

Example benefits of the modification system described herein include, but are not limited to, one or more of the following: (1) an improvement on spectrum utilization is achieved because the modification system only needs to send unidirectional communications in a direction where an endpoint is located rather than to mimic omni-directional communications; (2) a time duration to sweep all receivers located in different directions during the beam sweeping is reduced; and (3) processing power and energy can be saved during the beam sweeping. These benefits may be realized during the beam alignment process or at other times that are beneficial to mmWave communication. Other benefits are also possible.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); mmWave communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM; a LTE message; a LTE-V2X message (e.g., a LTE-V2V message, a LTE-V2I message, an LTE-V2N message, etc.); a 5G-V2X message; and a mmWave message, etc.

As used herein, the words "geographic location," "location," "geographic position" and "position" refer to a latitude and longitude of an object (or, a latitude, longitude, and elevation of an object) such as a vehicle or some other connected endpoint. Some of example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, some of the example embodiments described herein are able to describe the geographic position of the vehicle with lane-level accuracy or better.

Example Overview

Figure 1B:
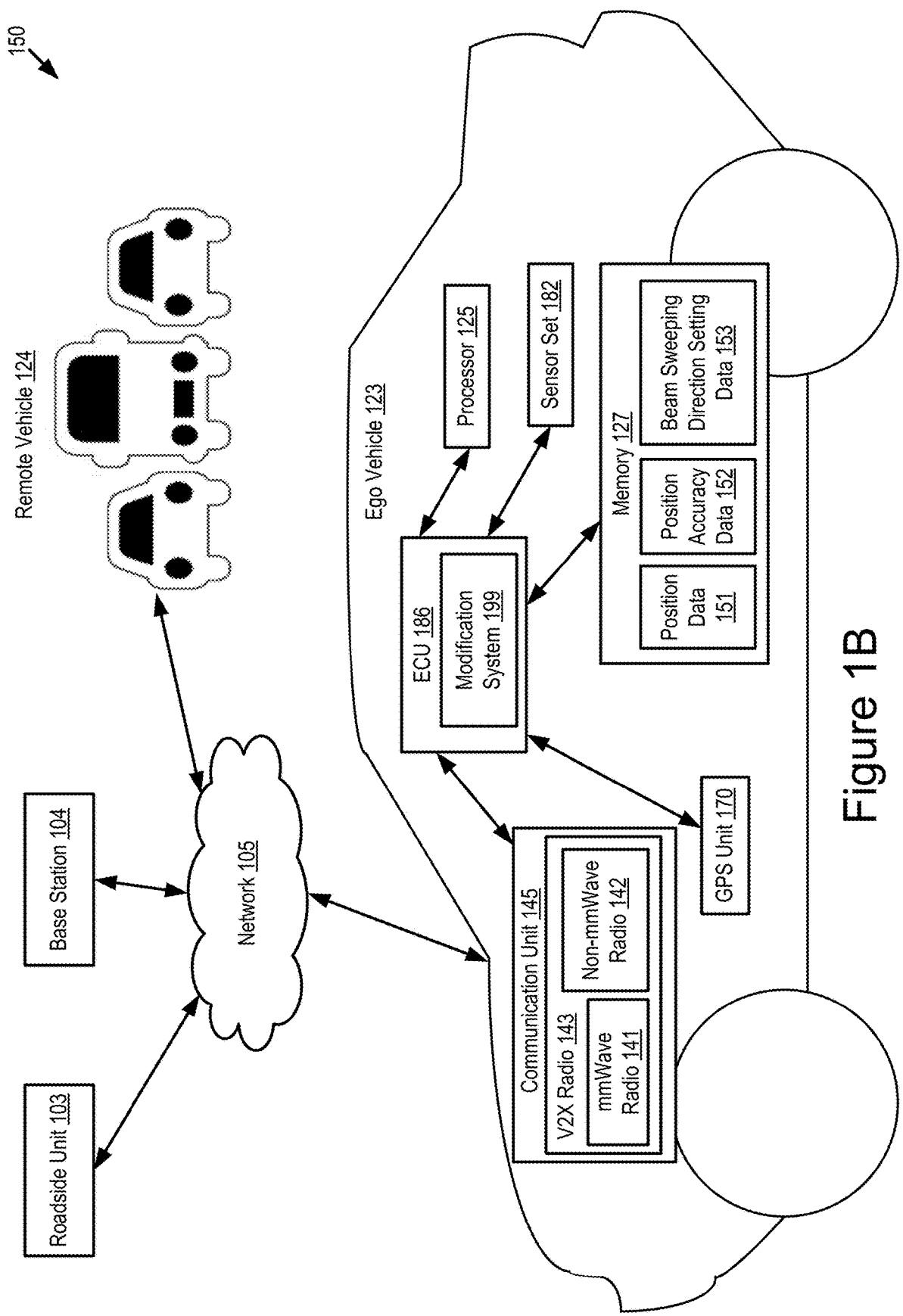
FIG. 1B is a block diagram illustrating a mobile operating environment for a modification system according to some embodiments.

Referring to FIG. 1B, depicted is a mobile operating environment 150 for a modification system 199 according to some embodiments. The operating environment 150 may include one or more of the following elements: an ego vehicle 123; one or more remote vehicles 124; a roadside unit (RSU) 103; and a base station 104. These elements of the operating environment 150 may be communicatively coupled to a network 105.

Although one ego vehicle 123, three remote vehicles 124, one roadside unit 103, one base station 104 and one network 105 are depicted in FIG. 1B, in practice the operating environment 150 may include any number of ego vehicles 123, remote vehicles 124, roadside units 103, base stations 104 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X messages among various endpoints (e.g., vehicles, roadside equipment, base stations, etc.) that each include a V2X radio.

The ego vehicle 123 may be any type of vehicle. For example, the ego vehicle 123 may include one of the following types of vehicles: a car; a truck; a sports utility vehicle; a bus; a semi-truck; a drone; or any other roadway-based conveyance.

In some embodiments, the ego vehicle 123 may include an autonomous vehicle or a semi-autonomous vehicle. For example, the ego vehicle 123 may include an Advanced Driver-Assistance System (ADAS system) or an autonomous driving system. The ADAS system or the autonomous driving system may provide some or all of the autonomous functionality of the ego vehicle 123.

The ego vehicle 123 may include one or more of the following elements: a processor 125; a memory 127; a communication unit 145; a GPS unit 170; a sensor set 182; an electronic control unit (ECU) 186; and the modification system 199. These elements of the ego vehicle 123 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199. The onboard vehicle computer system may be operable to access and execute the data stored on the memory 127 to provide the functionality described herein for the modification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 may include one or more memories 127.

The memory 127 may store one or more of the following elements: position data 151; position accuracy data 152; and beam sweeping direction setting data 153.

The position data 151 includes digital data that describes a geographic location of an endpoint as determined by one or more onboard sensors of this particular endpoint. For example, the position data 151 includes GPS data describing the geographic location of the endpoint, where the GPS data is received via a V2X message from the endpoint. In some embodiments, the position data 151 also includes digital data that describes a geographic location of the ego vehicle 123 as determined by one or more onboard sensors of the ego vehicle 123. For example, the position data 151 also includes GPS data describing the geographic location of the ego vehicle 123.

The position accuracy data 152 includes digital data that describes an accuracy for the one or more onboard sensors of the endpoint that determine the geographic location of the endpoint. In some embodiments, the position accuracy data 152 also includes digital data that describes an accuracy for the one or more onboard sensors of the ego vehicle 123 that determine the geographic location of the ego vehicle 123. For example, the position accuracy data 152 indicates that the position data 151 has a lane-level accuracy. In this way, a measurement error of the one or more onboard sensors of the endpoint or the ego vehicle 123 may be accounted for by the modification system 199 of the ego vehicle 123 when providing its functionality.

The beam sweeping direction setting data 153 includes digital data describing a beam sweeping direction setting for a V2X radio of the ego vehicle 123. The beam sweeping direction setting includes a directional sweeping range within which a mmWave radio beam of the V2X radio of the ego vehicle 123 is configured to sweep during a beam alignment process. For example, the beam sweeping direction setting describes an arch or area where a mmWave radio of the ego vehicle 123 may sweep in order to perform a beam alignment process so that the ego vehicle 123 and the endpoint can exchange mmWave communications via the mmWave radio.

The communication unit 145 transmits and receives data to and from the network 105 or to another communication channel. In some embodiments, the communication unit 145 may include a DSRC transceiver, a DSRC receiver and other hardware or software necessary to make the ego vehicle 123 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 may include: a mmWave radio 141 configured for mmWave communications (e.g., for transmitting and receiving mmWave messages); and a non-mmWave radio 142 configured for non-mmWave communications (e.g., for transmitting and receiving non-mmWave messages). For example, the non-mmWave communications may include DSRC communications, LTE-V2X, NR-V2X, ITS-Connect, or any other type of V2X communications that does not include mmWave.

Different non-mmWave communications can be used in different countries. For example, if the modification system 199 is implemented in the United States, then DSRC may be ideal for use as a form of the non-mmWave communications. If the modification system 199 is implemented in Japan, then ITS-Connect may be ideal for use as a form of the non-mmWave communications. If the modification system 199 is implemented in China, then LTE-V2X may be ideal for use as a form of the non-mmWave communications.

In some embodiments, the GPS unit 170 is a conventional GPS unit of the ego vehicle 123. For example, the GPS unit 170 may include hardware that wirelessly communicates with a GPS satellite to retrieve data that describes a geographic location of the ego vehicle 123. For example, the GPS unit 170 retrieves GPS data describing the geographic location of the ego vehicle 123 from one or more GPS satellites.

In some embodiments, the GPS unit 170 is a DSRC-compliant GPS unit of the ego vehicle 123 that is operable to provide GPS data describing the geographic location of the ego vehicle 123 with lane-level accuracy. In this case, the ego vehicle 123 can be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters (±1.5 m) is sufficient to identify which lane a vehicle is traveling in on a roadway.

The sensor set 182 includes one or more sensors that are operable to measure a roadway environment outside of the ego vehicle 123. For example, the sensor set 182 may include one or more sensors that record one or more physical characteristics of the roadway environment that is proximate to the ego vehicle 123. In another example, the sensor set 182 may include range finding and position locating sensors such as LIDAR, radar and GPS, as well as any other sensors that may be used to determine the position data stored on the memory 127 described herein (e.g., the position data 151, the position accuracy data 152, etc.). The memory 127 may also store sensor data that describes the one or more physical characteristics recorded by the sensor set 182.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 may be a computing device onboard on the ego vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ego vehicle 123 may include multiple ECUs 186. In some embodiments, the modification system 199 may be an element of the ECU 186.

In some embodiments, the modification system 199 includes software that is operable, when executed by the processor 125, to cause the processor 125 to execute one or more steps of methods 300 and 400 described below with reference to FIGS. 3-4 and one or more operations described below with reference to FIGS. 5A-6C.

In some embodiments, the modification system 199 may be implemented using hardware including a field-programmable gate array ("FPGA") or an application-specific integrated circuit ("ASIC"). In some other embodiments, the modification system 199 may be implemented using a combination of hardware and software. The modification system 199 may be stored in a combination of the devices (e.g., servers or other devices), or in one of the devices.

The modification system 199 is described in more detail below with reference to FIGS. 2-6C.

In some embodiments, the ego vehicle 123 and the remote vehicle 124 may have a similar structure, and the description provided for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the modification system 199.

The roadside unit 103 may be any infrastructure device on a roadside. The base station 104 may be a land station in the land mobile service. Here, the roadside unit 103, the base station 104, the remote vehicle 124 and the ego vehicle 123 are examples of an endpoint that is connected to the network 105. Other examples of the endpoint are also possible. The endpoint may be equipped with the communication unit 145 (including the V2X radio 143) and include its own instance of the modification system 199.

Example Computer System

Figure 2:
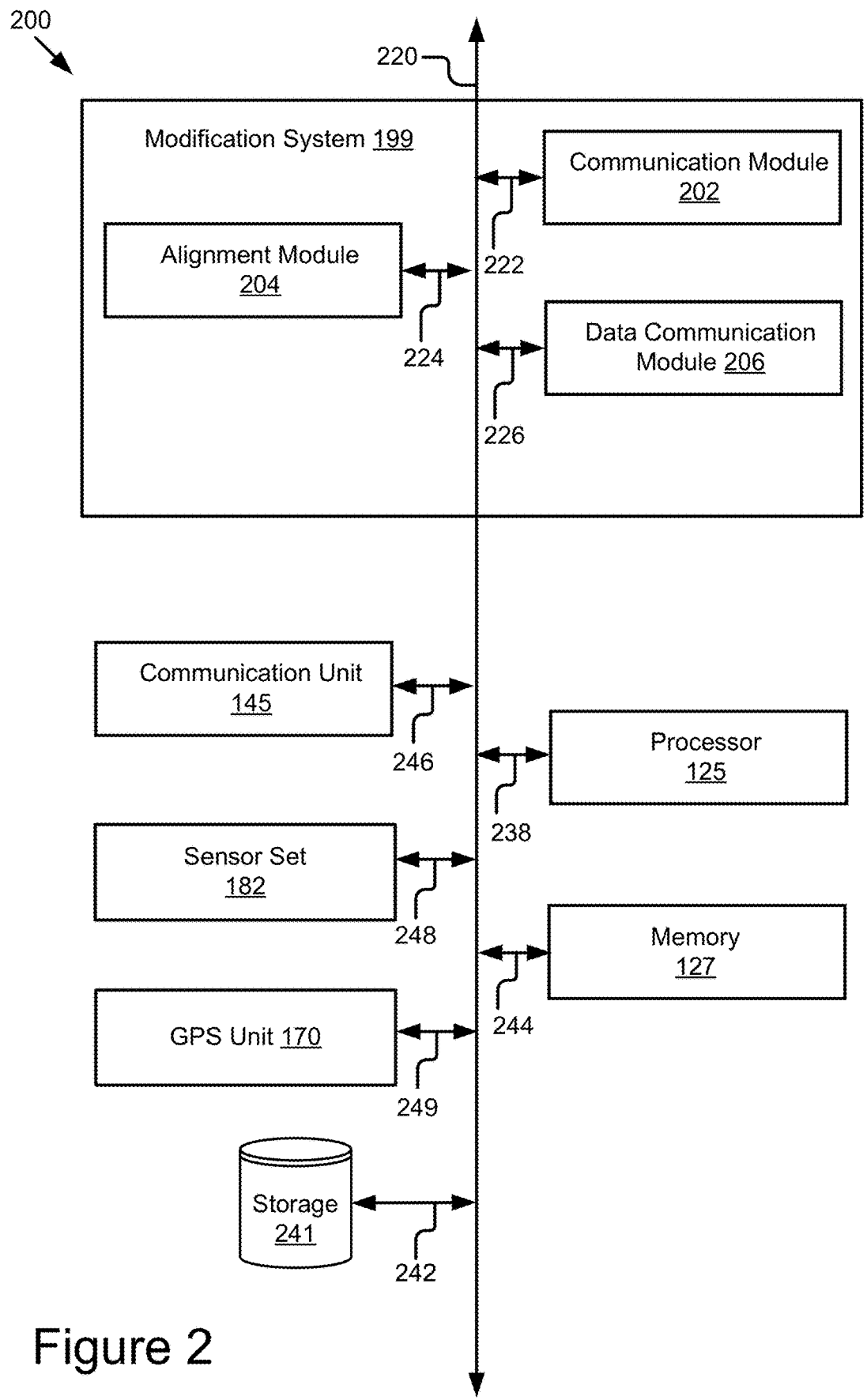
FIG. 2 is a block diagram illustrating an example computer system including the modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of methods 300 and 400 described below with reference to FIGS. 3-4 and one or more operations described below with reference to FIGS. 5A-6C.

In some embodiments, the computer system 200 may be an element of the ego vehicle 123. In some embodiments, the computer system 200 may be an onboard vehicle computer of the ego vehicle 123. In some embodiments, the computer system 200 may include an engine control unit, head unit or some other processor-based computing device of the ego vehicle 123.

The computer system 200 may include one or more of the following elements according to some examples: the modification system 199; the processor 125; the communication unit 145; the sensor set 182; the GPS unit 170; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244.

The following elements of the computer system 200 are described above with reference to FIG. 1B, and so, those descriptions will not be repeated here: the processor 125; the communication unit 145; the sensor set 182; the GPS unit 170; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the modification system 199 includes: a communication module 202; an alignment module 204; and a data communication module 206. These components of the modification system 199 are communicatively coupled to each other via the bus 220. In some embodiments, components of the modification system 199 can be stored in a single server or device. In some other embodiments, components of the modification system 199 can be distributed and stored across multiple servers or devices. For example, some of the components of the modification system 199 may be distributed across the ego vehicle 123 and any other endpoint.

The communication module 202 can be software including routines for handling communications between the modification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 150. For example, the communication module 202 receives or transmits, via the communication unit 145, a V2X message. The communication module 202 may send or receive any of the data or messages described above with reference to FIG. 1B via the communication unit 145.

In some embodiments, the communication module 202 receives data from components of the modification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the modification system 199. For example, the communication module 202 may handle communications among the alignment module 204 and the data communication module 206. Any of these modules may cause the communication module 202 to communicate with the other elements of the computer system 200 or the operating environment 150 (via the communication unit 145). For example, the alignment module 204 may use the communication module 202 to communicate with the sensor set 182 and cause the sensor set 182 to record sensor data.

The alignment module 204 can be software including routines for performing a beam alignment process. In some embodiments, the alignment module 204 can be stored in the memory 127 of the computer system 200 and can be accessible and executable by the processor 125. The alignment module 204 may be adapted for cooperation and communication with the processor 125 and other components of the computer system 200 via a signal line 224.

In some embodiments, the alignment module 204 may operate one or more sensors of the sensor set 182 to generate sensor data describing the measurements of the sensor set 182. The alignment module 204 may cause the sensor data to be stored in the memory 127. For example, the alignment module 204 may cause the GPS unit 170 to retrieve position data (e.g., GPS data) describing a geographic location of the ego vehicle 123.

In some embodiments, the alignment module 204 determines position accuracy data associated with the position data. For example, the alignment module 204 determines position accuracy data indicating that the position data of the ego vehicle 123 has a lane-level accuracy (e.g., with a measurement error of ±1.5 m).

In some embodiments, the alignment module 204 transmits, via the non-mmWave radio 142, a V2X message that includes the position data and the position accuracy data of the ego vehicle 123. In some embodiments, the V2X message transmitted by the ego vehicle 123 also includes a data sharing request that requests recipients of the V2X message to share their sensor data with the ego vehicle 123.

In some embodiments, the alignment module 204 of the ego vehicle 123 receives, via the non-mmWave radio 142, a V2X message transmitted by an endpoint. The V2X message transmitted by the endpoint includes one or more of the following: (1) position data describing a geographic location of the endpoint; (2) position accuracy data describing an accuracy of the position data of the endpoint; and (3) a data sharing request from the endpoint that requests recipients of the V2X message to share their sensor data with the endpoint.

If the V2X message transmitted by the endpoint includes the data sharing request from the endpoint, the alignment module 204 of the ego vehicle 123 may transmit a reply V2X message that includes an acknowledgement to the data sharing request via the non-mmWave radio 142. For example, the acknowledgement includes schedule information for a mmWave communication to be performed between the ego vehicle 123 and the endpoint so that directional transmission and reception of the mmWave communication are enabled according to the schedule information.

In some embodiments, the alignment module 204 is operable to determine a beam sweeping direction setting for a mmWave beam alignment with the endpoint based on the position data that describes a geographic location of the endpoint. For example, the beam sweeping direction setting includes a directional sweeping range (e.g., an arch or area) within which a mmWave radio beam of the V2X radio 143 of the ego vehicle 123 is configured to sweep during the mmWave beam alignment. The directional sweeping range includes the geographic location of the endpoint.

For example, based on the position data of the endpoint, the alignment module 204 determines the beam sweeping direction setting to include a beam lobe that points at a direction of the endpoint. The beam lobe includes the geographic location of the endpoint within its communication range. A beam of the mmWave radio 141 of the ego vehicle 123 is configured to sweep using the beam lobe during the mmWave beam alignment.

In some embodiments, the alignment module 204 may take the position accuracy data of the endpoint into consideration when determining the beam sweeping direction setting. For example, assume that the position data has a lane-level accuracy (e.g., with a measurement error of ±1.5 m). Then, the position accuracy data may have a measurement error of ±1.5 m. The determined beam sweeping direction setting is configured to be tolerable with a position deviation of ±1.5 m.

In some embodiments, the alignment module 204 is operable to modify an operation of the V2X radio 143 of the ego vehicle 123 to perform the mmWave beam alignment with the endpoint based on the beam sweeping direction setting. In this way, an efficiency of the mmWave beam alignment is improved. For example, the alignment module 204 sweeps a beam of the mmWave radio 141 to align the beam with the endpoint so that the beam of the mmWave radio 141 sweeps only in a direction indicated by the beam sweeping direction setting. This beam sweeping based on the beam sweeping direction setting is feasible because: (1) the endpoint is located at the geographic location indicated by the position data of the endpoint (which may be corrected based on the position accuracy data of the endpoint); and (2) an arch or area swept by the mmWave radio 141 includes this geographic location within its sweeping range. This process is faster than sweeping in all directions because less area needs to be covered by the sweeping. As a result, time, processor power and energy are saved during the mmWave beam alignment.

The data communication module 206 can be software including routines that, when executed by the processor 125, cause the processor 125 to perform a mmWave communication with the endpoint using the V2X radio 143. In some embodiments, the data communication module 206 can be stored in the memory 127 of the computer system 200 and can be accessible and executable by the processor 125. The data communication module 206 may be adapted for cooperation and communication with the processor 125 and other components of the computer system 200 via a signal line 226.

In some embodiments, responsive to a completion of the mmWave beam alignment performed by the alignment module 204, the data communication module 206 performs a mmWave communication with the endpoint using a beam lobe selected during the mmWave beam alignment. For example, the data communication module 206 modifies an operation of the mmWave radio 141 of the ego vehicle 123 to execute a mmWave communication with the endpoint using the mmWave beam alignment. The mmWave radio 141 exchanges the mmWave communication with the endpoint using the beam lobe determined by the beam sweeping direction setting.

Example Processes

Figure 3:
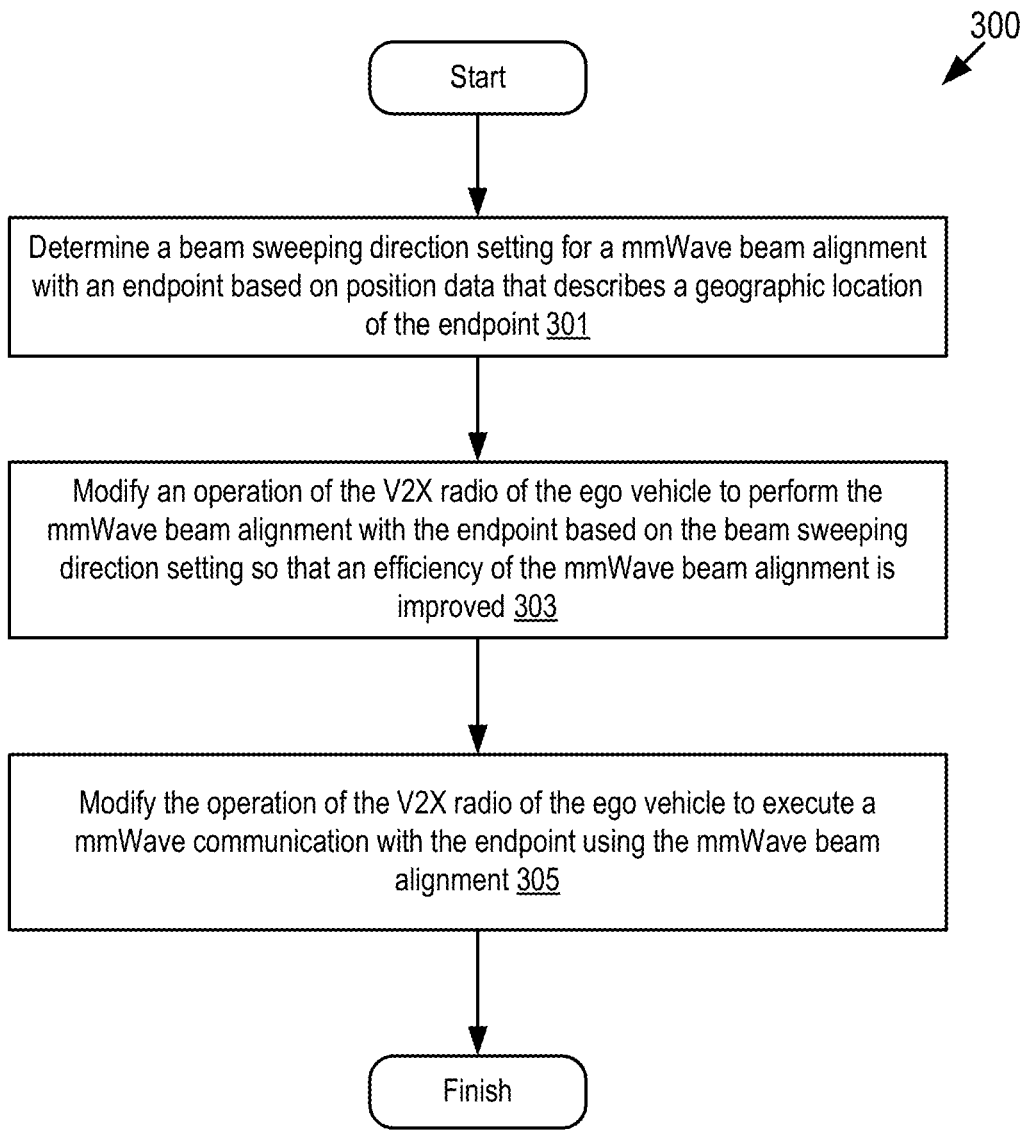
FIG. 3 depicts a method for executing a beam alignment for a mmWave communication based on position data according to some embodiments.

Referring now to FIG. 3, depicted is a flowchart of an example method 300 for executing a beam alignment for a mmWave communication based on position data according to some embodiments. The steps of the method 300 are executable in any order, and not necessarily the order depicted in FIG. 3. The method 300 may be executed by the ego vehicle 123.

At step 301, the alignment module 204 determines a beam sweeping direction setting for a mmWave beam alignment with an endpoint based on position data that describes a geographic location of the endpoint.

At step 303, the alignment module 204 modifies an operation of the V2X radio 143 of the ego vehicle 123 to perform the mmWave beam alignment with the endpoint based on the beam sweeping direction setting so that an efficiency of the mmWave beam alignment is improved.

At step 305, the alignment module 204 modifies the operation of the V2X radio 143 of the ego vehicle 123 to execute a mmWave communication with the endpoint using the mmWave beam alignment.

Figure 4:
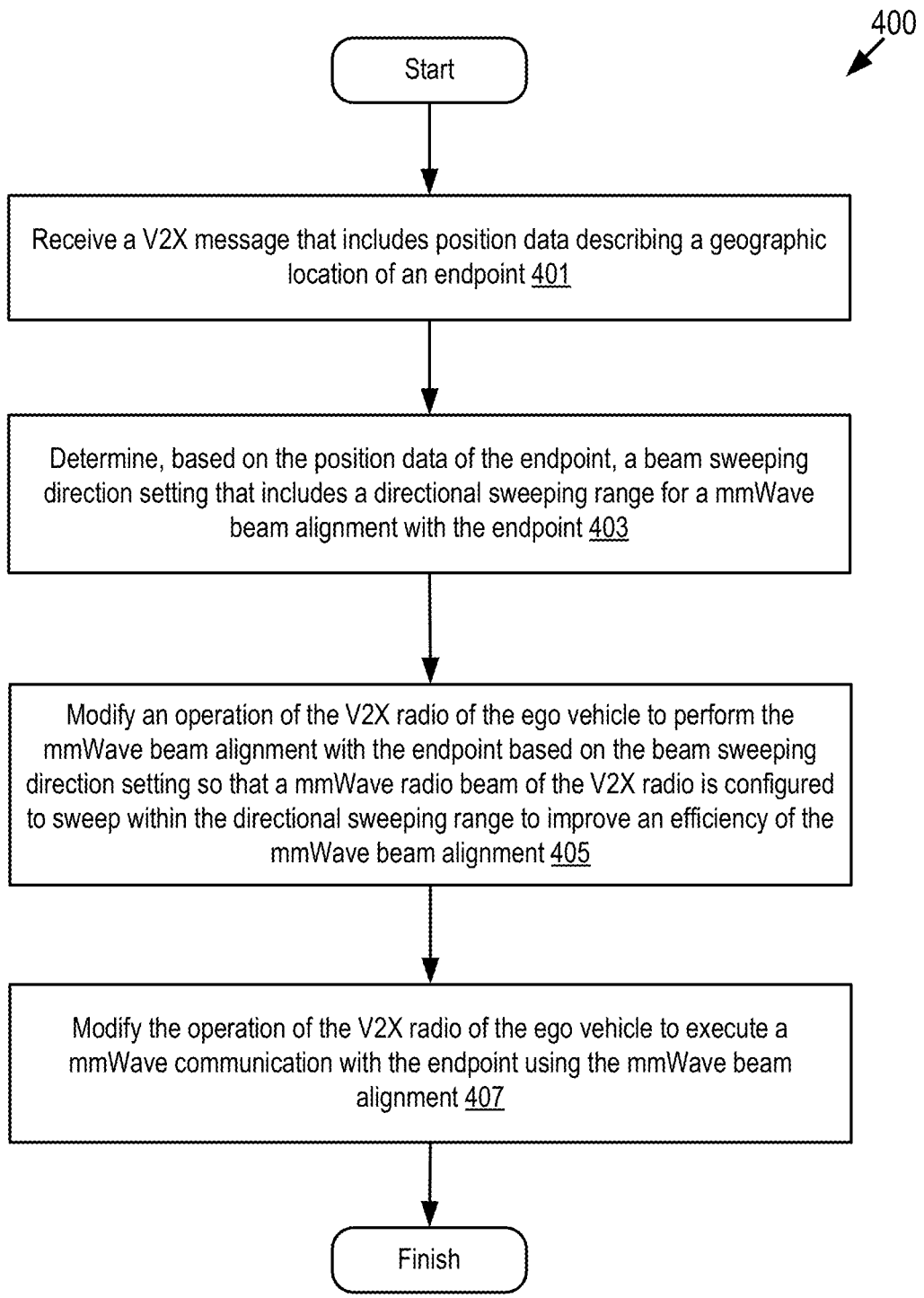
FIG. 4 depicts another method for executing a beam alignment for a mmWave communication based on position data according to some embodiments.

FIG. 4 depicts another method 400 for executing a beam alignment for a mmWave communication based on position data according to some embodiments. The steps of the method 400 are executable in any order, and not necessarily the order depicted in FIG. 4. The method 400 may be executed by the ego vehicle 123.

At step 401, the alignment module 204 receives a V2X message that includes position data describing a geographic location of an endpoint via the V2X radio 143.

At step 403, the alignment module 204 determines, based on the position data of the endpoint, a beam sweeping direction setting that includes a directional sweeping range for a mmWave beam alignment with the endpoint.

At step 405, the alignment module 204 modifies an operation of the V2X radio 143 of the ego vehicle 123 to perform the mmWave beam alignment with the endpoint based on the beam sweeping direction setting so that a mmWave radio beam of the V2X radio 143 is configured to sweep within the directional sweeping range to improve an efficiency of the mmWave beam alignment.

At step 407, the alignment module 204 modifies the operation of the V2X radio 143 of the ego vehicle 123 to execute a mmWave communication with the endpoint using the mmWave beam alignment.

Figure 5A:
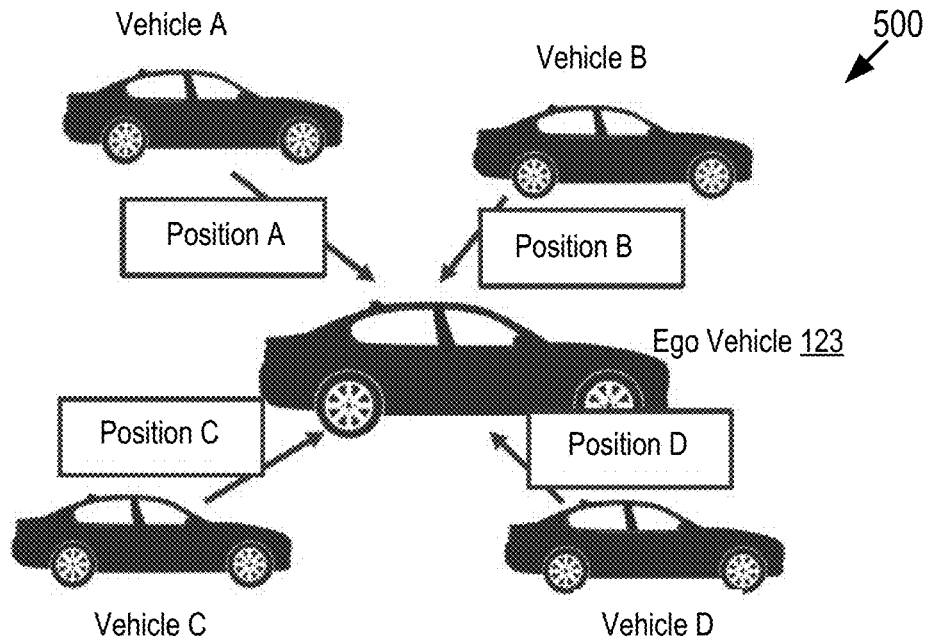
FIGS. 5A-5B are graphical representations illustrating an example beam alignment based on position data according to some embodiments.
Figure 5B:
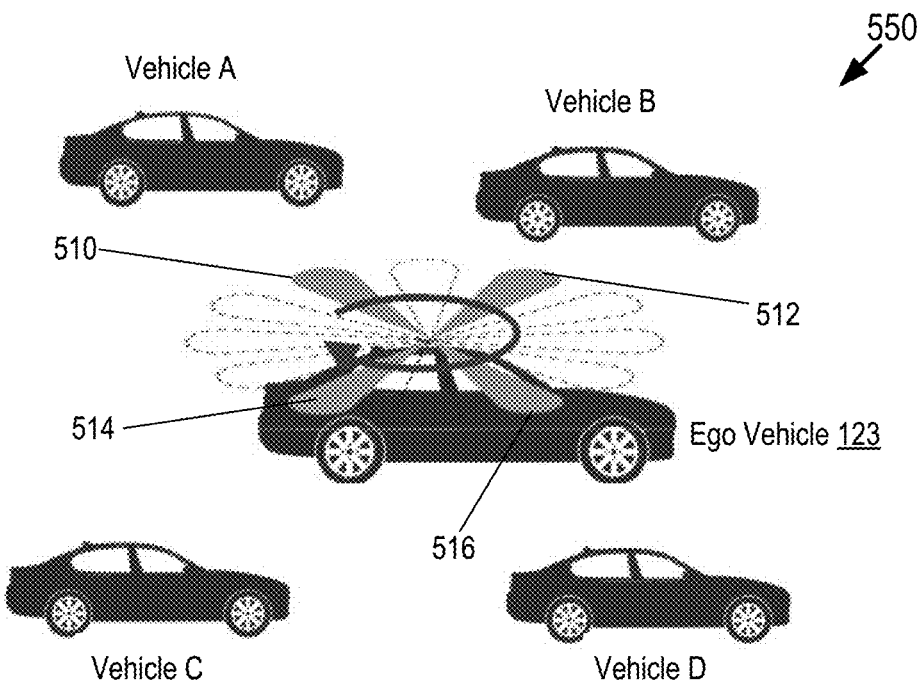

FIGS. 5A-5B are graphical representations 500 and 550 illustrating an example beam alignment based on position data according to some embodiments. In a roadway environment depicted in FIGS. 5A-5B, the ego vehicle 123 is surrounded by four remote vehicles 124 (e.g., vehicles A, B, C and D). Here, by way of examples, the ego vehicle 123 is a transmitter of a mmWave communication, and the vehicles A, B, C and D are receivers of the mmWave communication. It is noted that the transmitter and any receiver of the mmWave communication can also be any endpoint in the roadway environment including, for example, a vehicle, a roadside unit 103 and a base station 104, etc.

Each of the transmitter and the receivers has both a mmWave radio and a non-mmWave radio. Examples of the non-mmWave radio include, but are not limited to, the following: 5.9 GHz DSRC, LTE-V2X, NR-V2X and 760 MHz ITS-Connect, etc. Each receiver can share its position using the non-mmWave radio periodically (e.g., every 100 ms). Based on the position data shared by the receivers, the transmitter performs a mmWave beam sweeping for a beam alignment only for directions of the receivers.

In FIGS. 5A-5B, the ego vehicle 123 does not have to request position data from the remote vehicles 124 (e.g., the vehicles A, B, C and D) or provide the remote vehicles 124 with an acknowledgement.

Referring to FIG. 5A, the modification system 199 of each remote vehicle 124 causes a GPS unit of the remote vehicle 124 to retrieve position data that describes a geographical location of the remote vehicle 124. Each remote vehicle 124 including the modification system 199 executes this operation at a regular interval (e.g., once every second, once every 0.1 seconds, etc.).

Optionally, the modification system 199 of each remote vehicle 124 causes a processor of the remote vehicle 124 to determine position accuracy data for its position data. Each remote vehicle 124 including the modification system 199 executes this operation at a regular interval (e.g., once every second, once every 0.1 seconds, etc.) or for each new instance of the position data.

The modification system 199 of the remote vehicle 124 causes a V2X radio (e.g., a non-mmWave radio) of the remote vehicle 124 to transmit a V2X message including one or more of its position data and its position accuracy data to the ego vehicle 123. This V2X message may be broadcast or unicast. In some embodiments, this V2X message is a BSM message.

For example, the vehicle A is located at a position A. The vehicle A causes its non-mmWave radio to transmit a first V2X message to the ego vehicle 123, where the first V2X message includes one or more of first position data describing the position A and first position accuracy data describing an accuracy of the position A. The vehicle B is located at a position B. The vehicle B causes its non-mmWave radio to transmit a second V2X message to the ego vehicle 123, where the second V2X message includes one or more of second position data describing the position B and second position accuracy data describing an accuracy of the position B. The vehicle C is located at a position C. The vehicle C causes its non-mmWave radio to transmit a third V2X message to the ego vehicle 123, where the third V2X message includes one or more of third position data describing the position C and third position accuracy data describing an accuracy of the position C. The vehicle D is located at a position D. The vehicle D causes its non-mmWave radio to transmit a fourth V2X message to the ego vehicle 123, where the fourth V2X message includes one or more of fourth position data describing the position D and fourth position accuracy data describing an accuracy of the position D.

Referring to FIG. 5B, the non-mmWave radio 142 of the ego vehicle 123 receives the first V2X message, the second V2X message, the third V2X message and the fourth V2X message from the vehicles A, B, C, and D, respectively.

The modification system 199 of the ego vehicle 123 analyzes the first position data (optionally, the first position accuracy data as well), the second position data (optionally, the second position accuracy data as well), the third position data (optionally, the third position accuracy data as well) and the fourth position data (optionally, the fourth position accuracy data as well) to determine beam sweeping direction setting data. The beam sweeping direction setting data includes digital data that describes a directional sweeping range (e.g., one or more arches or areas) where the mmWave radio 141 of the ego vehicle 123 sweeps during a mmWave beam alignment.

In this example, the directional sweeping range includes: a beam lobe 510 that points at a direction of the vehicle A and has the position A within its communication range; a beam lobe 512 that points at a direction of the vehicle B and has the position B within its communication range; a beam lobe 514 that points at a direction of the vehicle C and has the position C within its communication range; and a beam lobe 516 that points at a direction of the vehicle D and has the position D within its communication range.

The modification system 199 of the ego vehicle 123 modifies an operation of the mmWave radio 141 of the ego vehicle 123 to perform the mmWave beam alignment so that a beam of the mmWave radio 141 sweeps only in directions of the beam lobes 510, 512, 514 and 516 indicated by the beam sweeping direction setting data. In this way, the mmWave beam alignment process based on the beam sweeping direction setting data can save time, processing power and energy when compared with beam sweeping in all directions.

Figure 6A:
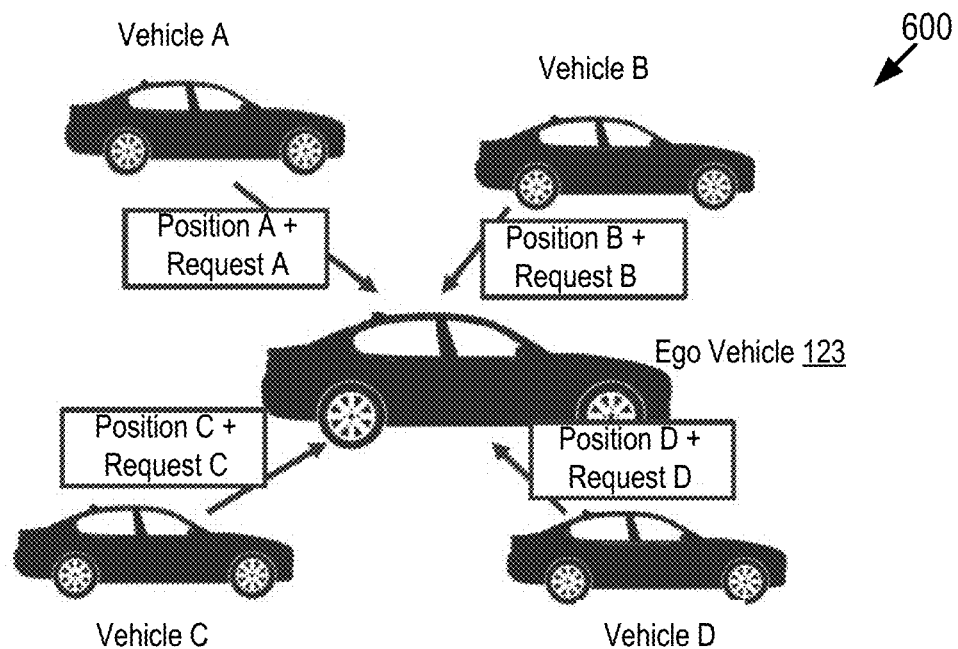
FIGS. 6A-6C are graphical representations illustrating another example beam alignment based on position data according to some embodiments.
Figure 6B:
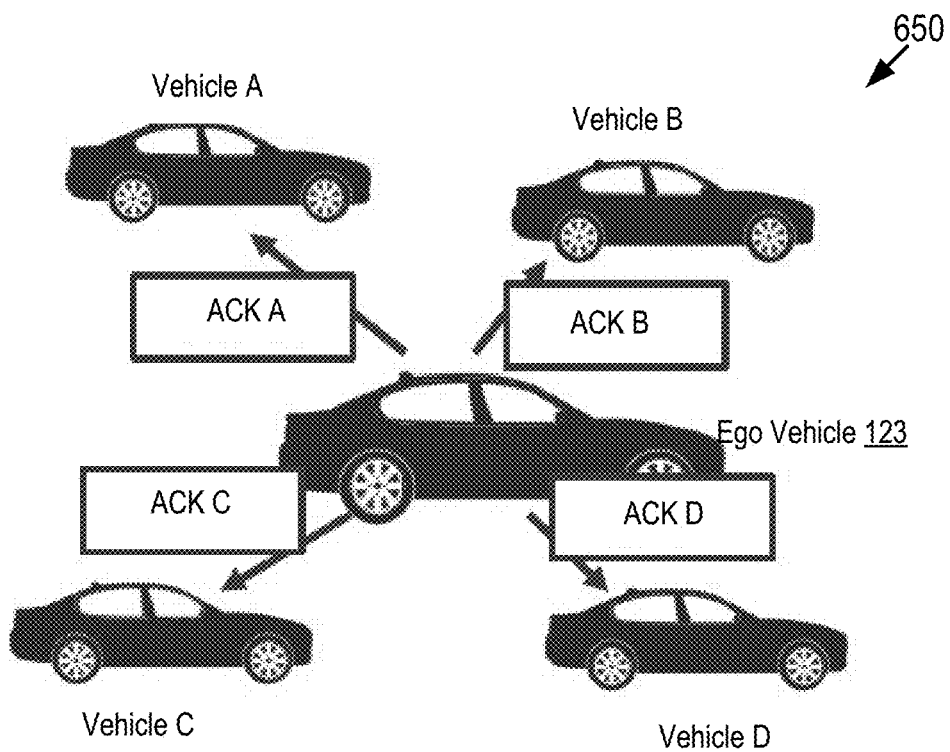
Figure 6C:
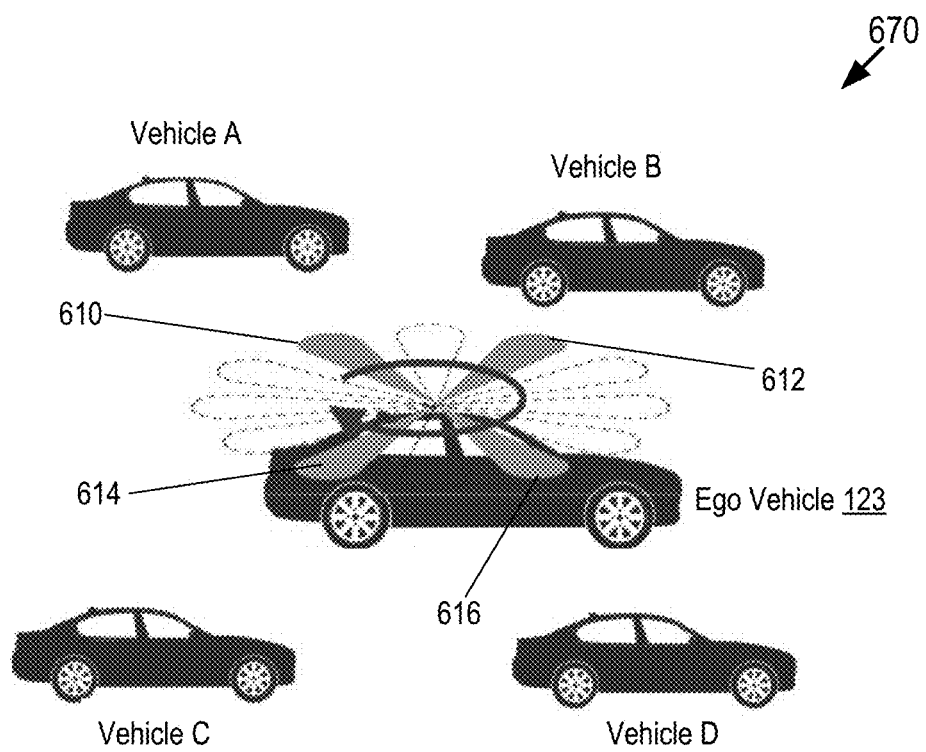

FIGS. 6A-6C are graphical representations 600, 650 and 670 illustrating another example beam alignment based on position data according to some embodiments. In the example shown in FIGS. 6A-6C, the modification systems 199 of the ego vehicle 123 and the remote vehicles 124 (e.g., the vehicles A, B, C and D) may perform operations similar to those described above for FIGS. 5A-5B. Similar description will not be repeated here.

Referring to FIG. 6A, in addition to the first position data describing the position A (and optionally the first position accuracy data), the first V2X message sent from the vehicle A also includes a data sharing request A from the vehicle A (e.g., illustrated as "Position A+Request A" in FIG. 6A). The data sharing request A requests recipients of the request to share its sensor data with the vehicle A. Similarly, the second V2X message sent from the vehicle B also includes a data sharing request B from the vehicle B that requests recipients of the request to share its sensor data with the vehicle B (e.g., illustrated as "Position B+Request B" in FIG. 6A). The third V2X message sent from the vehicle C also includes a data sharing request C from the vehicle C that requests recipients of the request to share its sensor data with the vehicle C (e.g., illustrated as "Position C+Request C" in FIG. 6A). The fourth V2X message sent from the vehicle D also includes a data sharing request D from the vehicle D that requests recipients of the request to share its sensor data with the vehicle D (e.g., illustrated as "Position D+Request D" in FIG. 6A).

Referring to FIG. 6B, the modification system 199 of the ego vehicle 123 causes its non-mmWave radio 142 to transmit acknowledgements (ACKs) A, B, C and D to the vehicles A, B, C and D, respectively. Each acknowledgement may be a broadcast or unicast non-mmWave V2X message. Each acknowledgement may include schedule information for a mmWave communication between the ego vehicle 123 and the corresponding vehicle so that directional transmission and reception of the mmWave communication are enabled according to the schedule information.

Referring to FIG. 6C, the modification system 199 of the ego vehicle 123 may perform operations similar to those described above for FIG. 5B to determine beam sweeping direction setting data. The beam sweeping direction setting data includes digital data that describes a directional sweeping range. In this example, the directional sweeping range includes: a beam lobe 610 that points at a direction of the vehicle A and has the position A within its communication range; a beam lobe 612 that points at a direction of the vehicle B and has the position B within its communication range; a beam lobe 614 that points at a direction of the vehicle C and has the position C within its communication range; and a beam lobe 616 that points at a direction of the vehicle D and has the position D within its communication range.

The modification system 199 of the ego vehicle 123 modifies an operation of the mmWave radio 141 of the ego vehicle 123 so that a beam of the mmWave radio 141 sweeps only in directions of the beam lobes 610, 612, 614 and 616. In this way, the beam alignment process based on the beam sweeping direction setting data can save time, processing power and energy when compared with beam sweeping in all directions.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of an engine control unit of an ego vehicle storing computer-executable code that, when executed by a processor, causes the processor to:

receive, from an endpoint, an electronic message that includes a data sharing request that requests that a recipient of the electronic message share sensor data with the endpoint, position data describing a geographic location of the endpoint, and position accuracy data describing an accuracy of the position data and a measurement error of one or more onboard sensors of the endpoint that determine the position data while the endpoint is traveling on a roadway, wherein the measurement error is within a position deviation of 1.5 meters;

transmit a reply V2X message that includes an acknowledgement to the data sharing request, wherein the acknowledgement includes schedule information for a millimeter wave (mmWave) communication between the ego vehicle and the endpoint so that directional transmission and reception of the mmWave communication are enabled according to the schedule information;

adaptively determine, based on the position data of the endpoint and the position accuracy data, a beam sweeping direction setting for a mmWave beam alignment with the endpoint wherein the beam sweeping direction setting is configured by the engine control unit to improve a time efficiency for the mmWave beam alignment by sending a set of unidirectional communications exclusively in a first direction where the endpoint is located, wherein the sending of the set of unidirectional communications is configured to satisfy the safety standard by sweeping less than 360 degrees;

modify an operation of a V2X radio of the ego vehicle to perform the mmWave beam alignment with the endpoint based on the beam sweeping direction setting, wherein the modification includes updating the beam sweeping direction setting responsive to receiving an updated position of the endpoint; and completing the mmWave communication based on the mmWave beam alignment within a time that satisfies a safety standard.

2. The computer program product of claim 1, wherein the beam sweeping direction setting is configured to improve one or more of a power efficiency and the time efficiency of a beam sweeping process that is controlled by the beam sweeping direction setting.

3. The computer program product of claim 1, wherein the beam sweeping direction setting includes a directional sweeping range for the mmWave beam alignment with the endpoint and the directional sweeping range includes the geographic location of the endpoint.

4. A method for an ego vehicle, comprising:

receiving, from an endpoint, an electronic message that includes a data sharing request that requests that a recipient of the electronic message share sensor data with the endpoint, position data that describes a geographic location of the endpoint, and position accuracy data describing an accuracy of the position data and a measurement error of one or more onboard sensors of the endpoint that determine the position data while the endpoint is traveling on a roadway, wherein the measurement error is within a position deviation of 1.5 meters;

transmitting a reply V2X message that includes an acknowledgement to the data sharing request, wherein the acknowledgement includes schedule information for a millimeter wave (mmWave) communication between the ego vehicle and the endpoint so that directional transmission and reception of the mmWave communication are enabled according to the schedule information;

determining, based on the position data of the endpoint and the position accuracy data, a beam sweeping direction setting for a mmWave beam alignment with the endpoint wherein the beam sweeping direction setting is configured by an engine control unit of the ego vehicle and the beam sweeping direction setting is operable to improve a time efficiency for the mmWave beam alignment by sending a set of communications exclusively in a first direction where the endpoint is located, wherein the sending of the set of unidirectional communications is configured to satisfy the safety standard by sweeping less than 360 degrees;

modifying an operation of a V2X radio of the ego vehicle to perform the mmWave beam alignment with the endpoint based on the beam sweeping direction setting, wherein the modifying includes updating the beam sweeping direction setting responsive to receiving an updated position of the endpoint; and completing the mmWave communication based on the mmWave beam alignment within a time that satisfies a safety standard.

5. The method of claim 4, further comprising modifying the operation of the V2X radio of the ego vehicle to execute the mmWave communication with the endpoint using the mmWave beam alignment.

6. The method of claim 4, wherein the beam sweeping direction setting includes a directional sweeping range within which a mmWave radio beam of the V2X radio is configured to sweep during the mmWave beam alignment.

7. The method of claim 6, wherein the directional sweeping range includes the geographic location of the endpoint.

8. The method of claim 4, wherein the V2X radio is configured to sweep within a directional sweeping range described by the beam sweeping direction setting to improve a power efficiency of the mmWave beam alignment.

9. The method of claim 4, wherein modifying causes the beam of the V2X radio to sweep in a direction indicated by the beam sweeping direction setting.

10. The method of claim 4, wherein the the electronic message is received by a non-mmWave radio.

11. The method of claim 4, further comprising retrieving global positioning system (GPS) data of the ego vehicle;

wherein determining the beam sweeping direction is further based on the GPS data.

12. The method of claim 4, wherein the endpoint includes a remote vehicle, a roadside unit or a base station.

13. A system comprising:

an engine control unit of an ego vehicle including a non-transitory memory storing computer code which, when executed by the engine control unit, causes the engine control unit to:

receive, from an endpoint, an electronic message that includes a data sharing request that requests that a recipient of the electronic message share sensor data with the endpoint, position data that describes a geographic location of the endpoint, and position accuracy data describing an accuracy of the position data and a measurement error of one or more onboard sensors of the endpoint that determine the position data while the endpoint is traveling on a roadway, wherein the measurement error is within a position deviation of 1.5 meters;

transmit a reply V2X message that includes an acknowledgement to the data sharing request, wherein the acknowledgement includes schedule information for a millimeter wave (mmWave) communication between the ego vehicle and the endpoint so that directional transmission and reception of the mmWave communication are enabled according to the schedule information;

determine, based on the position data of the endpoint and the position accuracy data, a beam sweeping direction setting for a mmWave beam alignment with the endpoint wherein the beam sweeping direction setting is configured by an engine control unit of the ego vehicle and the beam sweeping direction setting is operable to improve a time efficiency for the mmWave beam alignment by sending a set of communications exclusively in a first direction where the endpoint is located, wherein the sending of the set of unidirectional communications is configured to satisfy the safety standard by sweeping less than 360 degrees;

modify an operation of a V2X radio of the ego vehicle to perform the mmWave beam alignment with the endpoint based on the beam sweeping direction setting, wherein the modification includes updating the beam sweeping direction setting responsive to receiving an updated position of the endpoint; and complete the mmWave communication based on the mmWave beam alignment within a time that satisfies a safety standard.

14. The system of claim 13, wherein the computer code, when executed by the engine control unit, causes the engine control unit further to modify the operation of the V2X radio of the ego vehicle to execute the mmWave communication with the endpoint using the mmWave beam alignment.

15. The system of claim 13, wherein the beam sweeping direction setting includes a directional sweeping range within which a mmWave radio beam of the V2X radio is configured to sweep during the mmWave beam alignment.

16. The system of claim 15, wherein the directional sweeping range includes the geographic location of the endpoint.

17. The system of claim 13, wherein the data sharing request requests that a recipient of the reply V2X message share sensor data with the endpoint.

18. The system of claim 13, wherein the modification causes the beam of the V2X radio to sweep in a direction indicated by the beam sweeping direction setting.

19. The system of claim 13, wherein modifying the operation of the V2X radio to perform the mmWave beam alignment improves one or more of a time efficiency and a power efficiency of the mmWave beam alignment.

20. The system of claim 13, wherein the computer code, when executed by the engine control unit, causes the engine control unit further to retrieve global positioning system (GPS) data of the ego vehicle;

wherein determining the beam sweeping direction is further based on the GPS data.

* * * * *